Figure 1:
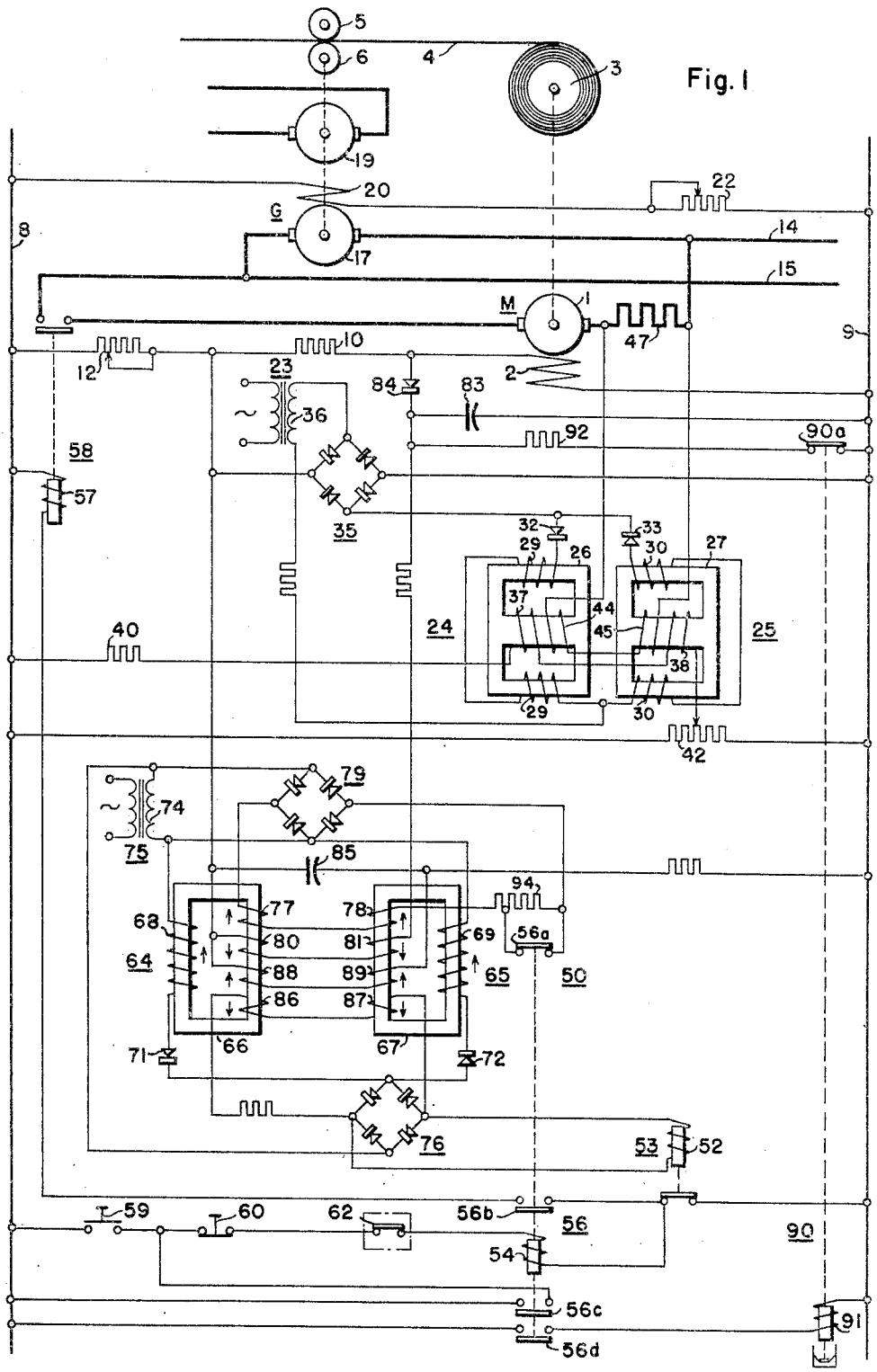

United States Patent Office 2,709,772
Patented May 31, 1955

2,709,772

STRIP TENSION MOTOR CONTROL SYSTEM WITH STRIP BREAKAGE PROTECTION

Martin H. Fisher, Pittsburgh, and Sylvester J. Campbell, North Braddock, Pa., assignors to Westinghouse Electric Corporation, East Pittsburgh, Pa., a corporation of Pennsylvania Application January 21, 1954, Serial No. 405,356

12 Claims. (Cl. 318—6)

Our invention relates to motor control systems, and it is a general object of our invention to provide an improved control system for a reel motor.

More specifically, it is an object of our invention to provide, in a control system for a reel motor, for automatically stopping the motor in the event of breakage of the material being handled by the reel.

It is one purpose of our invention to provide for stopping a reel motor automatically in the event of a strip breakage, in response to a change in an electrical condition of the motor caused by such strip breakage.

Another object of our invention is to provide, in a control system for a reel motor, for using a magnetic amplifier for stopping the motor when the voltage across the motor field drops below a predetermined value and at greater than a predetermined rate as will be the case where a tension regulator reduces the field excitation in an effort to maintain strip tension.

Yet another object of our invention is to provide for using a magnetic amplifier relay in a reel motor control system for opening the armature circuit of the motor in the event of a breakage of the material.

It is also an object of our invention to provide in a reel motor control system for utilizing a stored electrical energy circuit in connection with the field circuit of the motor for effecting stoppage of the motor when the field strength is decreased at greater than a predetermined rate.

It is an important object of our invention to provide in a reel motor control system for utilizing a capacitor circuit for operating a magnetic amplifier to effect stoppage of the motor when the voltage applied to the reel motor field in a constant tension regulating system is reduced at greater than a predetermined rate.

Other objects will in part be obvious, and will in part be explained hereinafter.

In practicing our invention in one of its forms, the armature of a reel motor is energized in accordance with the speed of the processing machine with which it is associated, and the shunt field thereof is connected to a source of excitation in series with an impedance device to provide a minimum value of field excitation. A magnetic amplifier is utilized to provide excitation cumulative with respect to the minimum excitation, in accordance with the armature current, so as to maintain a constant tension in the material being wound. A capacitor is connected across the field winding of the motor with a rectifier to block the discharge of the capacitor directly through the field winding, and a magnetic amplifier controlling the energization of a control relay for stopping the motor has its control windings connected in series with the capacitor and at least a portion of the impedance, so as to be energized by a differential voltage when the shunt field excitation is suddenly reduced by the regulator, as when the material breaks.

Figure 2:
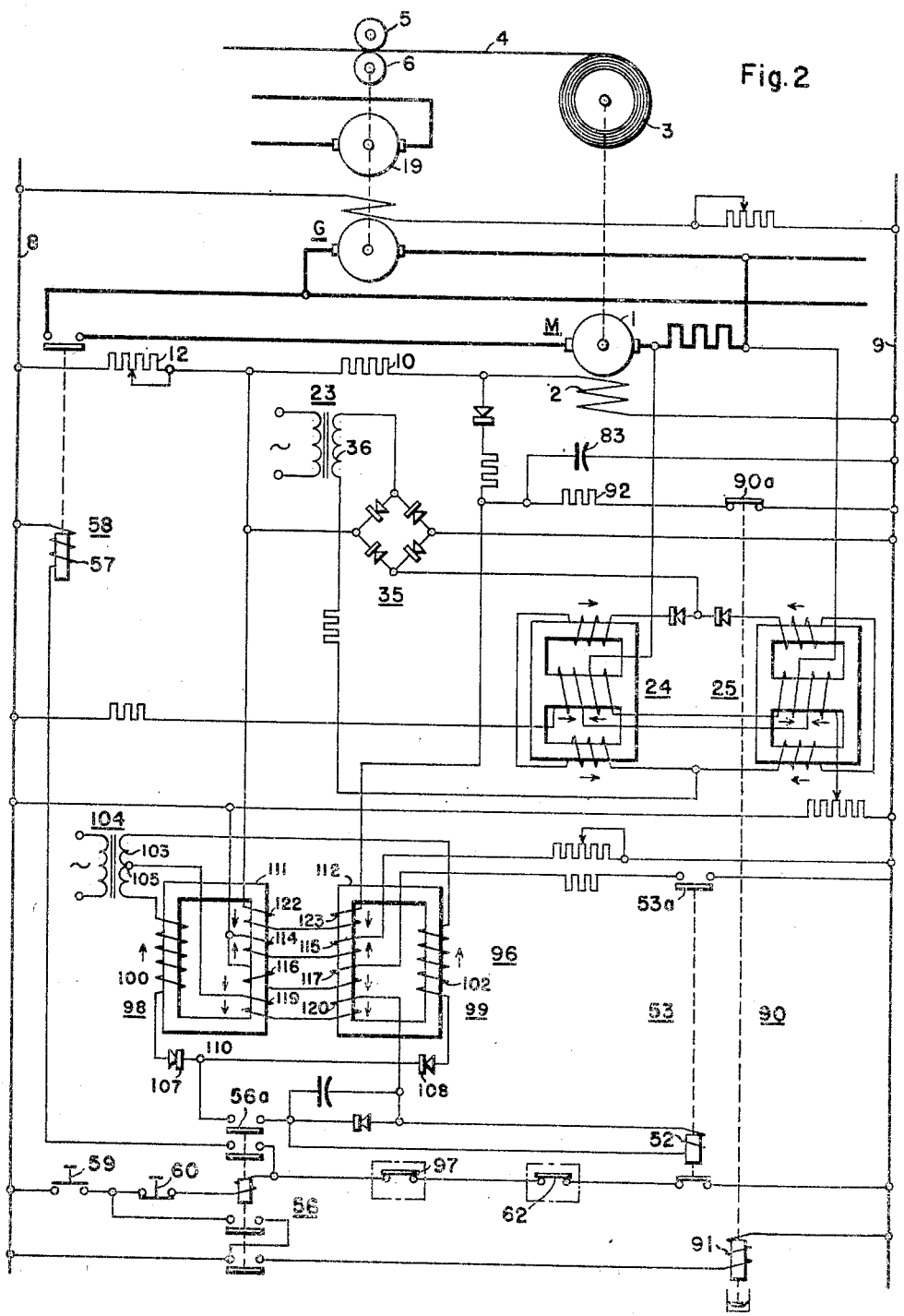

For a more complete understanding of the nature and scope of our invention, reference may be made to the following detailed description, which may be read in connection with the accompanying drawings, in which:

Fig. 1 is a schematic diagram of a reel drive embodying the invention in one of its forms, and Fig. 2 is a schematic diagram of a similar reel drive embodying the invention in a different form.

Referring to Fig. 1, the letter M denotes a reel motor having an armature 1 and a field winding 2 and which is provided for driving a reel 3 for winding a strip of material 4, such as paper, foil, metal strip, or the like, proceeding from a processing machine represented by the rolls 5 and 6. The field winding 2 is connected to direct-current conductors 8 and 9 in series with a fixed resistor 10 and an adjustable resistor 12 to provide a minimum safe value of field excitation. The armature 1 is supplied with electrical energy from conductors 14 and 15 having a voltage which is substantially proportional to the speed of the strip 4. For example, the conductors 14 and 15 are connected to the armature 17 of a generator G which is driven by a motor 19 driving the rolls 5 and 6. The generator G has a field winding 20 which is energized from the conductors 8 and 9 through an adjustable resistor 22.

The principal excitation of the field winding 2 is provided from an alternating-current transformer 23 under the control of a magnetic amplifier comprising a pair of saturable reactors 24 and 25. The reactors 24 and 25 have three-legged magnetic cores 26 and 27 provided respectively with reactance windings 29 and 30 connected in parallel, with rectifiers 32 and 33 in series with windings 29 and 30, respectively, with the rectifiers connected in opposed relation with the respective windings so as to permit only unidirectional current flow through the windings. The windings 29 and 30, with their respective series connected rectifiers 32 and 33, are connected in series with the input circuit of a rectifier bridge circuit 35 and the secondary winding 36 of the transformer 23. The output circuit of the rectifier bridge circuit 35 is connected across the field winding 2 and the resistor 10, which is adjacent thereto, with its polarity such that it is cumulative with respect to the excitation received by the field winding 2 from the conductors 8 and 9. The reactors 24 and 25 are provided with bias windings 37 and 38 connected to the conductors 8 and 9 through a resistor 40 and a voltage divider 42 so as to oppose the magnetization produced by the reactance windings. Control windings 44 and 45 are disposed on the reactors and are connected across a resistor 47 in the armature circuit of the motor M so as to provide for magnetization of the cores cumulatively with respect to the effect of the reactance windings. This will provide for varying the excitation of the field winding 2 in accordance with changes in the current of the armature 1 so as to maintain a substantially constant value of armature current and, therefore, a substantially constant value of tension in the strip 4.

In order to provide for automatically stopping the motor M in the event that the strip 4 breaks, a magnetic amplifier circuit 50 is provided for controlling the operation of a "stop" control relay 53 having contacts connected in series circuit relation with the operating winding 54 of a control relay 56 which provides for energizing the operating winding 57 of a contactor 58 which completes the armature circuit of the motor M. A "start" push-button switch 59 and a "stop" push-button switch 60 are also connected in circuit with the operating winding 54 for normally controlling operation of the motor. Contacts 62 connected in circuit with the operating winding 54 represent the contact of protective devices, such as an overload relay or the like used to protect the motor M.

The magnetic amplifier circuit 50 includes a pair of saturable reactors 64 and 65 having magnetic cores 66 and 67 provided with reactance windings 68 and 69, respectively. Oppositely poled rectifier devices 71 and 72 are connected in series with the windings 68 and 69, respectively. The reactance windings and series connected rectifiers are connected in series circuit relation with the secondary winding 74 of an alternating-current transformer 75 and the input circuit of a rectifier bridge circuit 76. The output circuit of the bridge circuit 76 is connected to the operating winding 52 of the stop relay 53. The saturable reactors are provided with negative bias windings 77 and 78 connected in opposition to the reactance windings and energized from a rectifier bridge circuit 79 connected to the secondary winding 74 so as to prevent false operation of the relay 53 with variations in the alternating-current voltage. Control windings 80 and 81 are provided for the reactor and these control windings are connected in shunt relation with the resistor 10 and in series circuit relation with a capacitor 83 connected across the field winding 2. A rectifier device 84 is connected in circuit with the capacitor 83 to provide for charging the capacitor from the field circuit, and preventing a direct discharge of the capacitor through the field winding in the event that the voltage applied to the field winding is suddenly reduced. Positive feedback windings 86 and 87 are provided on the reactors and are connected in parallel circuit with the operating winding 52 of the stop relay so as to provide a magnetization cumulative with respect to that of the control windings for maintaining the conductivity of the magnetic amplifier circuit once it is initiated. Compensating windings 88 and 89 are provided in conjunction with a commutating capacitor 85 for preventing the ripple voltage from the bridge circuit 35 from operating the relay.

In order to provide for preventing operation of the magnetic amplifier 50 during acceleration of the reel motor, a time-delay relay 90 may be provided having an operating winding 91 which is connected for energization through contacts of the control relay 56. The time-delay relay normally connects a shunting resistor 92 across the capacitor 83 to prevent charging thereof until a predetermined time after the motor is started. The negative bias windings 77 and 78 are connected to the rectifier bridge circuit 79 through a resistor 94 which is shunted by a normally closed contact 56a of relay 56. Thus when the drive is shut down, the excitation of the negative bias windings is increased, which causes the magnetic amplifier to become substantially deenergized when the drive is at rest.

The motor M may be started by closing the "start" push-button switch 59 which thereupon provides an energizing circuit for the operating winding 54 of the control relay 56. Relay 56 operates and provides an energizing circuit for the operating winding 57 of the line contactor 58 through contact member 56b, and also provides an energizing circuit for the operating winding 91 of the time-delay relay 90 through contact member 56d. A holding circuit for the control relay is provided through contact member 56c. While the motor M is accelerating, the resistor 92 is connected across the capacitor 83 through contact member 90a of the time-delay relay, thus preventing charging thereof.

When the motor has reached a substantially constant speed, the time-delay relay opens contacts 90a and capacitor 83 is charged through rectifier device 84 to the voltage of field winding 2. Thus the control windings 80 and 81 of the saturable reactors 64 and 65 will not be subject to any current flow, since the voltages across the resistor 10 and the capacitor 83 will normally be substantially equal.

The saturable reactors 24 and 25 normally operate to gradually increase the excitation of the field winding 2, as the armature current tends to increase, to thereby restore the armature current to a predetermined value as determined by the excitation of windings 37 and 38, as the material 4 is wound upon the reel 3, in the manner described in Patent No. 2,611,114, which issued on September 16, 1952, to Martin H. Fisher. With such gradual change of excitation, the charge on the capacitor will vary at a rate closely corresponding to the rate of change of field excitation, thus maintaining the deenergized condition of the control windings. Should the material 4 break, tension is lost and the saturable reactors 24 and 25 operate to immediately reduce the excitation of the field winding 2 in an effort to increase the speed of the motor M and regain tension. This reduction in field excitation is so rapid that the capacitor 83 cannot follow the change in voltage and, therefore, the voltage of the capacitor will at least temporarily exceed that of the resistor 10. The rectifier device 84 blocks any discharge of the capacitor 83 directly through the field winding 2, so that it discharges through the control windings 81 and 80, thereby rendering the reactors 64 and 65 conductive, so that relay 52 is energized from transformer 75 through the rectifier bridge circuit 76. At the same time, the positive feedback windings 86 and 87 are energized in a direction cumulative with respect to that of the control windings 80, 81 so that the magnetic amplifier 50 maintains its conductivity. Relay 53 operates, interrupting the energizing circuits of the control relay 56 and the line contactor 58. The armature 1 of the reel motor is thereby disconnected from the generator G to stop the motor. At the same time, resistor 94 is shunted by contact member 56a of the control relay so as to increase the excitation of the negative bias windings 77 and 78, so as to render the magnetic amplifier 50 nonconductive.

Referring to Fig. 2, it will be seen that the reel drive is substantially the same as that shown in Fig. 1, the motor M having an armature 1 energized from the generator G and a field winding 2 which receives a minimum value of excitation from conductors 8 and 9 through resistors 10 and 12. The principal excitation of the field winding 2 is likewise regulated by saturable reactors 24 and 25 which connect the input circuit of a rectifier bridge circuit 35 to the secondary winding 36 of an alternating-current transformer 23. The output circuit of the rectifier bridge circuit 35 is likewise connected across the field winding 2 and the resistor 10 so as to vary the excitation of the field winding 2 cumulatively with respect to its minimum excitation. A magnetic amplifier 96 is also used to control the operation of a "stop" relay 53 which effects the energization of a control relay 56 and a line contactor 58 which connects the motor M to the generator G. Operation of the magnetic amplifier 96 is likewise controlled by a capacitor 83 connected across the field winding 2, and the charging of the capacitors 83 is also prevented by means of a resistor 92 connected thereacross by means of a time-delay relay 90 during starting operations. "Start" and "stop" pushbutton switches 59 and 60, respetcively, are likewise used to control operation of the control relay 56 in conjunction with overload contacts 62 and an alternating-current supply interlock 97.

The magnetic amplifier 96 comprises saturable reactors 98 and 99 having reactance windings 100 and 102 which are connected to the opposite terminals of the secondary winding 103 of an alternating-current supply transformer 104, the secondary winding being provided with a center tap 105. The rectifier devices 107 and 108 are connected in circuit with the windings 100 and 102 and to a junction point 110 so as to provide for conduction through the reactor windings on alternate halves of the alternating-current cycle only for the purposes of producing premagnetization of the magnetic cores 111 and 112 of the reactors. Negative bias windings 114 and 115 are provided on the cores 111 and 112 for opposing the magnetization of the reactance windings. Positive bias windings 116 and 117 are provided on the cores and connected to the conductors 8 and 9 through contact member 53a of the stop relay 53 so as to provide for holding the stop relay in the operative position. Positive feedback windings 119 and 120 are provided on the cores for cumulative effect with respect to the reactance windings for increasing the conductivity of the magnetic amplifier. These windings are connected in series with the operating windings 52 of the stop relay 53. The control windings 122 and 123 are connected across the resistor 10 and in series with the capacitor 83 as are the control windings 80 and 81 in the system of Fig. 1. Contact member 56a of the control relay 56 is connected in circuit with the operating winding 52 to deenergize the stop relay once the control relay has been deenergized.

The motor M is started as in the system of Fig. 1 by operating the push-button switch 59 which provides an energizing circuit for the control relay 56. The stop relay 53 is thereby connected to the magnetic amplifier 96 and an energizing circuit is provided for the operating winding 57 of the line contactor 58, which operates to connect the motor M to the generator G. The operating winding 91 of the time-delay relay 90 is also energized when the control relay 56 operates, but maintains a shunt circuit through contact member 90a for a predetermined time until the motor reaches a normal operating speed.

During operation, the saturable reactors 24 and 25 function to control the excitation of the field winding 2 in accordance with the armature current of the motor M to maintain a substantially constant value of armature current, and hence strip tension. The capacitor 83 slowly charges to the voltage of the field winding 2 as soon as contact member 90a opens, and thereafter follows the voltage of the field winding which it is able to do at the rate of change thereof under normal operating conditions. Under such conditions, the voltage across the resistor 10 and that across the capacitor 83 are substantially equal so that the control windings 122 and 123 are not energized.

Should the strip 4 break, tension is lost and the saturable reactors 24 and 25 operate immediately to reduce the excitation of the field winding 2 in an effort to regain tension. This reduction is effected at such a rapid rate that the voltage of the capacitor 83 cannot follow such change. Hence the voltage of the capacitor will be higher than the voltage across the resistor 10, and a differential voltage exists which forces current through the control windings 122 and 123. This renders the reactance windings 100 and 102 conductive, so that the stop relay 53 is energized. The positive feedback windings 119 and 120, which are connected in series with the operating winding 52 and the center tap 105, are also energized and serve to increase the amplification of the magnetic amplifier. Operation of relay 53 interrupts the energizing circuit for the control relay 56, and also connects the positive bias field windings 116 and 117 to the conductors 8 and 9 so as to maintain the stop relay in the operated position. Line contactor 58 is deenergized when the control relay returns to the deenergized position, and the stop relay is disconnected from the magnetic amplifier at contact member 56a. This deenergizes the stop relay and renders the magnetic amplifier nonconductive. The time-delay relay 90 returns to the deenergized position and the apparatus is ready for a further operation.

In the above description and accompanying drawings, it will be apparent that we have provided an automatic stop circuit for a reel motor in the event of breakage of the strip of material, which circuit is relatively maintenance free. A control circuit embodying the features of our invention is relatively inexpensive to manufacture and is reliable in operation, since it embodies only magnetic amplifiers and well-known types of relay. Such a circuit is fail safe since it will shut down in the event of a failure of the alternating-current supply circuit.

Since certain changes may be made in the above-described construction, and different embodiments of the invention may be made without departing from the spirit and scope thereof, it is intended that all the matter contained in the above description and shown in the accompanying drawings, shall be considered as illustrative and not in a limiting sense.

We claim as our invention:

1. In a control system for a reel motor having an armature and a field winding, circuit means connecting the armature to a source of electrical energy, means connecting the field winding to a source of electrical energy, regulating means for varying the excitation of the field winding above that received from the source, reactance means responsive to the voltage across the field winding, and relay means responsive to a discharge of said reactance means incident to a predetermined rate of change of excitation of the field winding for effecting deenergization of the motor.

2. A control system for a reel motor having an armature and a field winding comprising, circuit means for connecting the armature to a source of electrical energy, impedance means connecting the field winding to a source to provide minimum excitation, regulating means for varying the excitation of the field winding above said minimum in accordance with the armature current, a reactance device connected across the field winding, and relay means including a magnetic amplifier having a winding connected across the impedance means and field winding in series with the reactance means to be energized by a predetermined differential between the voltages of the impedance means and reactance device for disconnecting the motor from the source.

3. A motor control system comprising, a motor having an armature and a field winding, circuit means connecting the armature to a circuit energized in accordance with the speed of an associated work device, circuit means including a resistor connecting the field winding to a source of excitation to provide a minimum excitation thereof, means including a regulator for varying the excitation of the field winding above said minimum value as a function of armature current, reactance means, circuit means including a rectifier connecting the reactance means across the field winding, a magnetic amplifier having a control winding connected across the impedance means and in series with the reactance means, and means including a relay operable in response to energization of the magnetic amplifier winding to effect disconnection of the armature from the source.

4. In a control system, a motor having an armature and a field winding, circuit means for connecting the armature to a variable voltage source, impedance means for connecting the field winding to a substantially constant voltage source, means including a regulator for applying a variable voltage across the winding and a portion of the impedance means, a reactance device, means including a rectifier connecting the reactance device across the field winding, a magnetic amplifier having a control winding connected in series with the reactance device across at least a portion of the impedance means so as to be energized from the reactance device upon a rapid reduction of the voltage from the regulator, and relay means operable in response to energization of said control winding to effect stopping of the motor.

5. In a control system, a motor having an armature and a field winding, a circuit for connecting the armature to a variable voltage source, impedance means connecting the field winding to a source of excitation including an impedance device having an impedance substantially equal to that of the field winding, a capacitor, impedance means including a rectifier connecting the capacitor across the field winding, a regulator connected across said impedance device and the winding for varying the excitation of the field winding in response to changes in armature current, a magnetic amplifier having a plurality of magnetic cores each with a plurality of windings thereon, circuit means connecting one of said plurality of windings on each core in a series circuit across the impedance device and in series with the capacitor to be energized by a differential between the voltages of the capacitor and the impedance device, a control relay, circuit means including another of said plurality of windings on each core and a rectifier device in series with each of said another windings connecting said control relay to a source of alternating current, and circuit means controlled by said relay means for effecting disconnection of the motor armature from the source.

6. In a control circuit for a reel motor having an armature and a field winding, circuit means including a line switch for connecting the armature to a source of electrical energy, a circuit including at least two impedance devices connecting the field winding to a source of excitation to provide a minimum value of excitation, regulating means connected across the field winding and the adjacent one of said impedance devices for varying the excitation of said winding in accordance with the value of the armature current to maintain a constant value thereof, a control relay operable to render the line switch inoperative, two saturable reactors having reactance windings connected in parallel with each other and in series with the control relay and a source of alternating current, rectifier means connecting the reactance windings and the control relay to a source of alternating current, a circuit including a rectifier and a capacitor connected across the field winding, and a control winding on each reactor, said control windings being connected in series with each other across the adjacent impedance device and in series with the capacitor.

7. A reel drive comprising, a direct-current motor having an armature and a field winding, a switch for connecting the armature to a source of adjustable voltage, a pair of resistors connecting the field winding to a source of voltage for supplying the minimum value of excitation, means including a pair of saturable reactors having reactance windings connecting the field winding and an adjacent one of said resistors to an alternating-current source for varying the excitation of the field winding in accordance with the armature current to maintain a constant value thereof, a relay operable to make the line switch inoperative, and means including a pair of saturable reactors having magnetic cores with reactance windings connecting the relay to a source, with rectifier means connected between the relay and said windings for effecting magnetization of the core of each reactor.

8. A reel drive comprising, a reel motor having an armature and a field winding, switch means connecting the armature to a source of electrical energy, a pair of resistors for connecting the field winding to a source of excitation, regulating means connecting the field winding and an adjacent one of said resistors for varying the excitation of said winding in accordance with the armature current to maintain a constant value of armature current, a control relay operable to render the switch means inoperative, a capacitor, means including a rectifier connecting the capacitor across the field winding for charging the capacitor, and a pair of saturable reactors each having a magnetic core with reactance winding and a control winding, said reactance windings being arranged in parallel to connect the control relay to a source of alternating current and having polarizing rectifiers for magnetizing the cores of said reactors, and said control windings being connected in series across said adjacent resistor and in series with said capacitor.

9. A reel drive comprising, a direct-current reel motor having an armature and a field winding, switch means for connecting the armature to a source of direct current, a pair of resistors for connecting the field winding to a source of excitation, regulating means connected across the field winding and an adjacent one of the resistors for varying the excitation of the field winding in accordance with the armature current to maintain a constant value thereof, a control relay for rendering the switch means inoperative, a capacitor, means including a rectifier connecting the capacitor across the field winding for charging, and a pair of saturable reactors each having a reactance winding, a control winding and a positive feedback winding, said reactance windings being arranged in parallel to connect the control relay to an alternating-current source and having polarizing rectifiers for effecting unidirectional flow through the reactance windings, said control windings being connected for energization by a differential between the voltage of the adjacent resistor and the capacitor, and said feedback windings being connected in series with the control relay for producing magnetization cumulative with respect to that of the control windings.

10. In a control circuit for a reel motor having an armature and a field winding, a circuit for connecting the armature to a source of direct current, impedance means connecting the field winding to a source of excitation, regulating means for applying a variable voltage to the field winding and the impedance means, a capacitor, rectifier means connecting the capacitor across the field winding, starting means for the motor, time-delay means preventing charging of the capacitor for a predetermined time after starting, and relay means responsive to an excess of voltage of the capacitor over that of the voltage impedance means for rendering the starting means inoperative.

11. A control circuit for a motor having an armature and a field winding comprising, switch means for connecting the armature to a source of electrical energy, impedance means for connecting the field winding to a source of electrical energy to provide a minimum value of excitation, regulating means for applying a voltage across the field winding and at least a portion of the impedance means for varying the excitation above said minimum value, said voltage being in accordance with the armature current and for maintaining said current at a constant value, starting means for effecting operation of the switch means, relay means operable to render the switch means inoperative, reactance means, a rectifier connecting the reactance means in shunt with the field winding, a pair of saturable reactors each having a core with a plurality of windings including reactance windings connecting the relay means to a source of alternating-current, rectifier means connected in circuit with each of the reactance windings to provide unidirectional magnetization of the core of each reactor, a circuit connecting another winding on each reactor as a control winding in series across said portion of the impedance means and in series with the capacitor, and means connecting yet another of said windings on each reactor to provide cumulative magnetization with respect to the control winding when the relay means operates.

12. A reel drive comprising, a direct-current motor having an armature and a field winding, switch means operable to connect the armature to a source of electrical energy, impedance means for connecting the field winding to a source of electrical energy to provide a minimum value of excitation, regulating means responsive to the armature current for applying a voltage to the field winding and a portion of the impedance means to maintain a constant value of armature current, a capacitor connected across the field winding, a rectifier connected in circuit with the capacitor, relay means operable to render the switch means inoperative, a pair of saturable reactors each having a reactance winding, means including a rectifier individual to each winding connecting the reactance windings in parallel to one terminal of an alternating-current source, a rectifier bridge circuit connecting the reactance windings to the other terminal of said source and to the relay means, a control winding on each reactor connected in series across said portion of the impedance means and in series with the capacitor, and delay means for shunting the capacitor for a predetermined time after the switch means operates.

References Cited in the file of this patent

UNITED STATES PATENTS 2,611,114    Fisher _____ Sept. 16, 1952